US009104347B2

(12) United States Patent
Raza et al.

(10) Patent No.: US 9,104,347 B2
(45) Date of Patent: Aug. 11, 2015

(54) SYSTEMS, METHODS, AND APPARATUS TO PRINT MESSAGES FROM AN ELECTRONIC MAILBOX (75) Inventors: Washim Raza, Karnataka (IN); Adarsh Suparna, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 448 days.

(21) Appl. No.: 13/280,810

(22) Filed: Oct. 25, 2011

(65) Prior Publication Data
US 2013/0100485 A1    Apr. 25, 2013

(51) Int. Cl.
G06F 3/12 (2006.01)
H04N 1/00 (2006.01)
G06Q 10/10 (2012.01)
G06Q 50/00 (2012.01)

(52) U.S. Cl.
CPC .............. *G06F 3/1204* (2013.01); *G06F 3/126* (2013.01); *G06F 3/1288* (2013.01); *G06F 3/1296* (2013.01); *G06F 3/1297* (2013.01); *G06Q 10/107* (2013.01); *G06Q 50/00* (2013.01); *H04N 1/00204* (2013.01)

(58) Field of Classification Search
USPC .............. 358/1.13, 1.15, 401, 402, 403, 1.14; 399/79, 80; 709/202, 203, 219
See application file for complete search history.

(56) References Cited

U.S. PATENT DOCUMENTS

| | | | | |
|---|---|---|---|---|
| 5,539,530 A * | 7/1996 | Reifman et al. | ............... | 358/402 |
| 5,805,298 A * | 9/1998 | Ho et al. | ............... | 358/402 |
| 6,883,040 B2 * | 4/2005 | Lee | ............... | 710/15 |
| 7,283,264 B2 * | 10/2007 | Parry | ............... | 358/1.15 |
| 7,593,122 B2 * | 9/2009 | Watanabe et al. | ............... | 358/1.14 |
| 8,237,966 B2 * | 8/2012 | Honda | ............... | 358/1.15 |
| 8,264,703 B2 * | 9/2012 | Isoda | ............... | 358/1.14 |
| 8,514,419 B2 * | 8/2013 | Fukasawa | ............... | 358/1.14 |

OTHER PUBLICATIONS

Hewlett-Packard Development Company, L.P., "Help and Tips," HP ePrintCenter, Aug. 28, 2011, <http://web.archive.org/web/20110828234332/http://h30495.www3.hp.com/help>.

* cited by examiner

*Primary Examiner* — Vu B Hang
(74) *Attorney, Agent, or Firm* — Hewlett-Packard Patent Department (57) ABSTRACT In one implementation, a print service system selects a message from a plurality of messages at an electronic mailbox and generates a print job associated with the message from the plurality of messages. The electronic mailbox is associated with an account of a print service system. The print service system provides the print job to a printer associated with the account.

19 Claims, 7 Drawing Sheets

ND APPARATUS TO
PRINT MESSAGES FROM AN ELECTRONIC
MAILBOX

BACKGROUND

A user of an electronic mailbox can print content included within messages received at that electronic mailbox via a local electronic mailbox client. For example, a user can access such messages via an electronic mail client application or program hosted at a computing device (e.g., an electronic mail client of a desktop computer, notebook computer, smartphone, or tablet device), and provide content included within those messages to a printer accessible to the computing device.

As another example, the local electronic mailbox client can include rules that are applied to messages to print messages that satisfy the rules. That is, the local electronic mailbox client downloads messages from a mail server, and applies rules to those messages. If a message satisfies a rule, the local electronic mailbox client prints content from that message.

DETAILED DESCRIPTION

Implementations discussed herein provide methods, systems, and apparatus to provide content from an electronic mailbox to a printer via a print service system. In other words, content received at an electronic mailbox can be printed without passing through a local electronic mailbox client at a computing device. For example, the print service system can be hosted at a data center that is remote from the printer.

Figure 1:
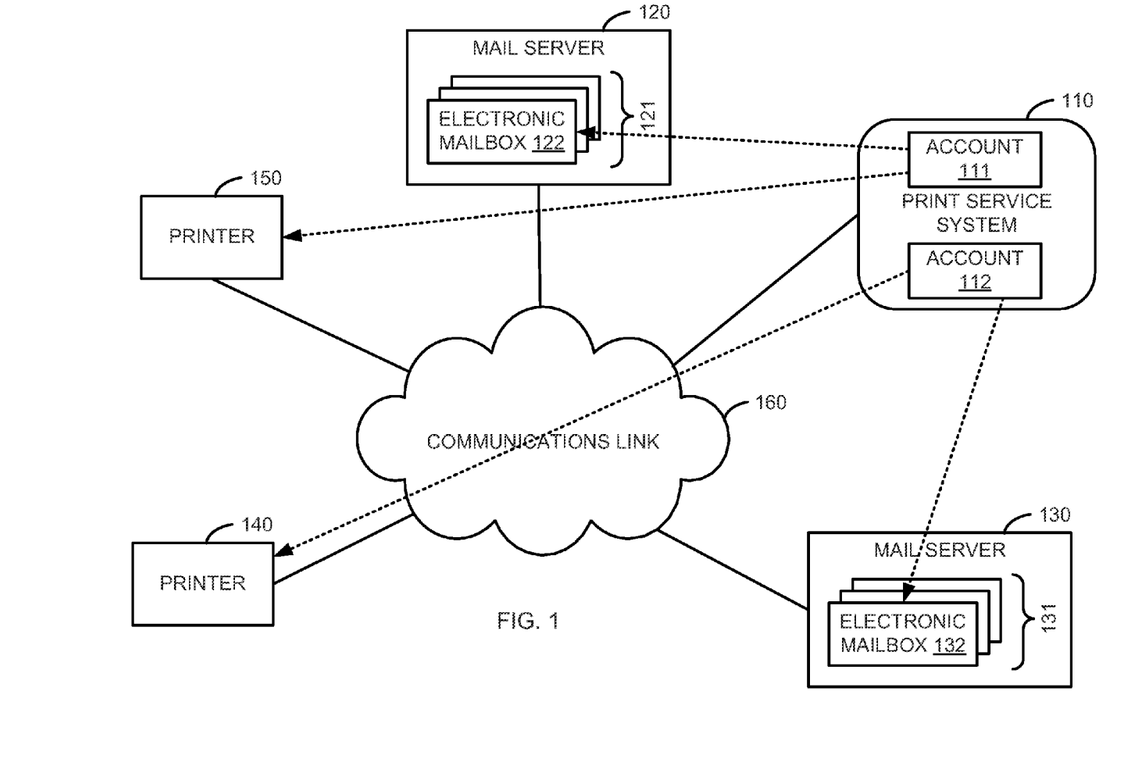
FIG. 1 is an illustration of an environment including a print service system, according to an implementation.

For example, FIG. 1 is an illustration of an environment including a print service system, according to an implementation. The environment illustrated in FIG. 1 includes print service system 110, mail server 120, mail server 130, printer 140, printer 150, and communications link 160. Mail servers 120 and 130 are each a computing device or group of computing devices that include software to manage electronic mailboxes 121 and 131, respectively. In other words, mail servers 120 and 130 receive, store, and/or send messages associated with electronic mailboxes 121 and 131, respectively. In some implementations, mail server 120 and/or mail server 130 can be a virtual computing device (or group thereof) such as a virtual machine.

Communications link 160 includes devices, services, or a combination thereof that define communications paths between print service system 110, mail servers 120 and 130, printers 140 and 150, and/or other devices or services. For example, communications link 160 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 160 can include communications networks such as an intranet, the Internet, other telecommunications networks, or a combination thereof. Additionally, communications link 160 can include proxies, routers, switches, gateways, bridges, load balancers, and similar communications devices. Furthermore, the connections and communications paths illustrated in FIG. 1 are logical and do not necessarily reflect physical connections.

Print service system 110 includes accounts 111 and 112 (e.g., user accounts of subscribers to print service system 110). Electronic mailbox 122 and printer 150 are associated with account 111. Electronic mailbox 132 and printer 140 are associated with account 112. Said differently, account 111 includes access information for mailbox 122 and printer 150 such as credentials (e.g., a username, a password, a digital certificate, or a cryptographic key) for electronic mailbox 122 at mail server 120 and a printer identifier (e.g., an Internet Protocol (IP) address, a port number, or a unique identifier) of printer 150, and account 112 includes access information for mailbox 132 and printer 140. Print service system 110 prints content from messages at electronic mailbox 122 at printer 150 using the access information of account 111, and prints content from messages at electronic mailbox 132 at printer 140 using the access information of account 112.

Figure 2:
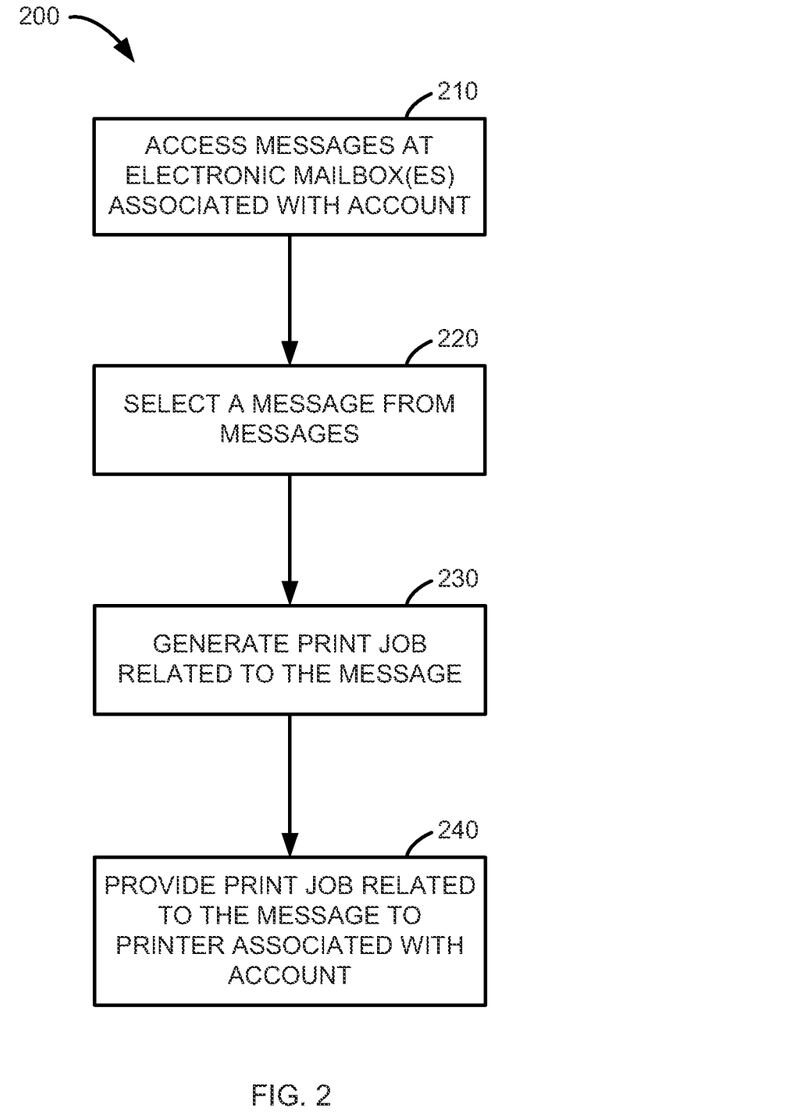
FIG. 2 is a flowchart of a print process, according to an implementation.

As an example, FIG. 2 is a flowchart of a print process, according to an implementation. Process 200 can be implemented, for example, at print service system 110 for account 111. Print service system 110 accesses messages at an electronic mailbox (or electronic mailboxes) associated with account 111 at block 210. As illustrated in FIG. 1, print service system 110 accesses messages at electronic mailbox 122 using access information of account 111. For example, print service system 110 logs in to electronic mailbox 122 using a username, password, and protocol such as the Post Office Protocol (POP) or Internet Message Access Protocol (IMAP). In other implementations, multiple electronic mailboxes are associated with an account, and messages at each of those electronic mailboxes are accessed at block 210.

A message is then selected at block 220 from the messages accessed at block 210. For example, a rule (or group of rules) can be applied to the messages, and a message that satisfies the rule (or one or more rules from the group of rules) is selected at block 220. As another example, print service system 110 can receive a request for a print job (or print job request) related to a message from a printer such as printer 150 illustrated in FIG. 1, and that message can be selected at block 220. That is, a request for a print job can include a message identifier, and the message identified or referenced by the message identifier can be selected at block 220. In some implementations, multiple messages are selected at block 220. For example, multiple messages can satisfy a rule or a request for a print job can include multiple message identifiers.

A print job is then generated at block 230 for the message (or messages) selected at block 220. A print job includes instructions and/or data that cause a printer to print content (here, content from the message selected at block 220). As specific example, the content can be the selected message itself, portions of the selected message, and/or attachments of the selected message (e.g., data files or encoded data represented data files included in the selected message). For example, a print job can include a print instruction (i.e., a command that instructs a printer to print) and data that defines the content to be printed and/or the format of the content. As more specific examples, the data can be formatted using a Portable Document Format (PDF) or a PostScript (PS) format.

The print job is then provided to a printer associated with the account at block 240. With reference to FIG. 1, print service system 110 provides the print job to printer 150 via communications link 160. The print job can be provided to the print using a variety of methodologies. For example, the print service system can address the print job to an IP address and port number at which the printer is accessible (e.g., at which the printer receives print jobs or data packets representing print jobs). As another example, the print service system can communicate with the printer using a messaging protocol such as the Extensible Messaging and Presence Protocol (XMPP). As yet another example, the print service system can store the print job at a repository that is accessible to the printer. The printer can access the repository to determine whether a print job is stored at the repository, and access the print job after the print job has been stored at the repository. After receiving or accessing the print job, the printer can execute or interpret the print job to print the content from the selected message.

Referring again to FIG. 1, print service system 110 can also execute process 200 for account 112. That is, print service system 110 can implement process 200 for multiple accounts (or for the accounts of multiple users or clients of print service system 110). Additionally, process 200 illustrated in FIG. 2 is an example implementation. Other implementations can include additional, fewer, or rearranged blocks (or functionalities or operations). For example, blocks 210 and 220 can be repeated serially or in parallel for each electronic mailbox associated with the account. Similarly, multiple printers can be associated with an account, and the print job can be provided to each of the multiple printers or to a subset of those messages at block 240.

Figure 3:
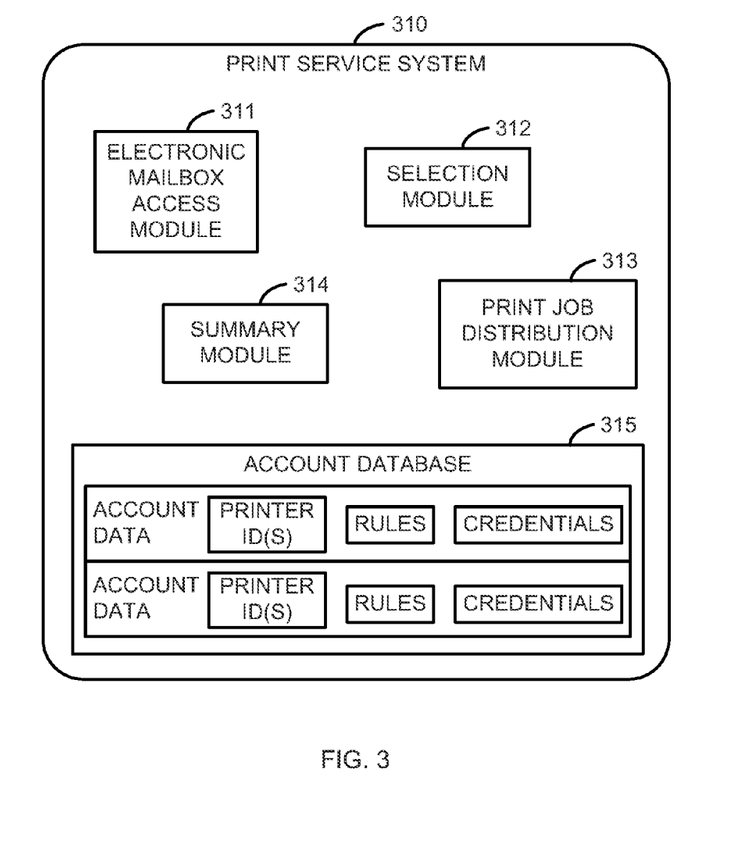
FIG. 3 is a schematic block diagram of a print service system, according to an implementation.

FIG. 3 is a schematic block diagram of a print service system, according to an implementation. Although various modules (i.e., combinations of hardware and software) are illustrated and discussed in relation to FIGS. 3-5 and other example implementations, other combinations or sub-combinations of modules can be included within other implementations. Said differently, although the modules illustrated in FIGS. 3-5 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Print service system 310 includes electronic mailbox access module 311, selection module 312, print job distribution module 313, summary module 314, and account database 315. Account database 315 includes account data for accounts of print service system 310. Account data includes, for example, identifiers (or printer identifier or printer IDs) of printers associated with (or claimed by) an account, rules that are to be applied to messages for an account, credentials to access electronic mailboxes or printers associated with an account, and/or other information such as server names or IP addresses of electronic mailboxes associated with an account. That is, each client or user of print service system 310 can have an account at account database 315 that stores information such as access information about printers and electronic mailboxes of that client that are registered with or claimed by print service system 310. In other words, each client or user of print service system 310 can be represented by an account at account database 315.

Electronic mailbox access module 311 accesses messages at one or more electronic mailboxes for or on behalf of an account (or the client of print service system 310 represented by that account). In other words, electronic mailbox access module 311 can access account data at account database 315 to, for example, log in to an electronic mailbox at a mail server and access messages at that electronic mailbox. As specific example, electronic mailbox access module 311 can implement POP, IMAP, and/or other protocols to access messages at electronic mailboxes.

Selection module 312 selects one or more messages from the messages accessed by electronic mailbox access module 311 to provide to print job distribution module 313. For example, selection module 312 receives messages that are accessed by electronic mailbox access module 311 and applies rules for an account in account database 315 and/or rules for print service system 310 (not shown) to the messages to select one or more messages. Said differently, selection module 312 can apply per-account rules (e.g., rules specified or defined at an account) and system rules (e.g., rules that apply to all accounts of print service system 310) to messages. As another example, selection module 312 can select one or more messages from the messages accessed by electronic mailbox access module 311 based on message identifiers included in requests for print jobs.

A rule includes a condition that can be satisfied by a message. For example, a rule can include a condition such as a character, group of characters, or definition of a pattern that can be included in one or more portions of a message. A message satisfies a rule if the message includes content that satisfies the condition of the rule. Selection module 312 applies a rule to a message by comparing content of the message with the condition or conditions of the rule. If the condition or conditions are satisfied, selection module 312 selects the message.

Some rules are associated with a particular portion of a message, and can be satisfied by content of the message at that portion, but not at other portions. For example, a rule can specify a source condition that applies to a source portion of the message such as a sender address. In some implementations, a rule can include a time condition that is satisfied at a particular time (e.g., a date or time of day) or time range. That is, a rule can include a condition that depends on a time the message is received, sent, or processed by a selection module. In some implementations, a rule can include a content condition that applies to any content of a message. That is, the content condition is compared with a source portion, a body portion, and attachments of a message, for example.

Print service system 310 can include an interface (not illustrated) for configuring rule. For example, print service system 310 can include an HTTP interface via which a client of print service system 310 can log in to print service system 310 to configure rules of the client's account or system rules. In other implementations, a user can configure rules via an application hosted at a computing device such as a desktop computer, notebook computer, smartphone or tablet that communications with print service system 310.

In some implementations, summary module 314 receives the messages accessed by electronic mailbox access module 311, and generates summaries (or summary information) for those messages. For example, summary module 314 can extract source (e.g., sender) information, subject or topic information, message body information, attachment information, or other information from related portions of the messages. As a specific example, summary module can extract subject information from a subject portion of the messages. Summary module 314 can then provide this information to a printer claimed by the account. A user of that printer can select a message (or group of messages) to print, and the printer can provide a print job request to print service system 310 including a message identifier (e.g., a value or group of values that identify a message) of a message (or message identifier of a group of messages) for which a print job should be sent to the printer. Selection module 312 can then select a message or a group of message based on the message identifier.

Print job distribution module 313 receives the message (or messages) selected by selection module 312 and generates a print job (or print jobs) based on that message. In some implementation, selection module 312 also indicates which content from the selected message should be included in the print job, and includes that content in the print job. For example, a rule can specify which content of the selected message should be included in the print job, and selection module 312 can provide a signal, instruction, or command to print job distribution module 313 indicating which content should be included in the print job. As another example, a print job request can include an indication of which content should be included in the print job, and that indication can be provided to print job distribution module 313 to allow or instruct print job distribution module 313 to include that content in the print job.

After generating the print job, print job distribution module 313 provides the print job to a printer or printers claimed by (or associated with) the account for which the messages were accessed at electronic mailbox access module 311. For example, print job distribution module 313 can access printer identifiers of printers to which the print job should be provided at account database 315, and can provide the print job to those printers. Similar to determining which content of a message should be included in a print job, a rule satisfied by a message or a print job request can indicate to which printers a print job should be provided. For example, a rule or a print job request can include a printer identifier or alias thereof to indicate to print job distribution module 313 to which printer or printers the print job should be provided.

Figure 4:
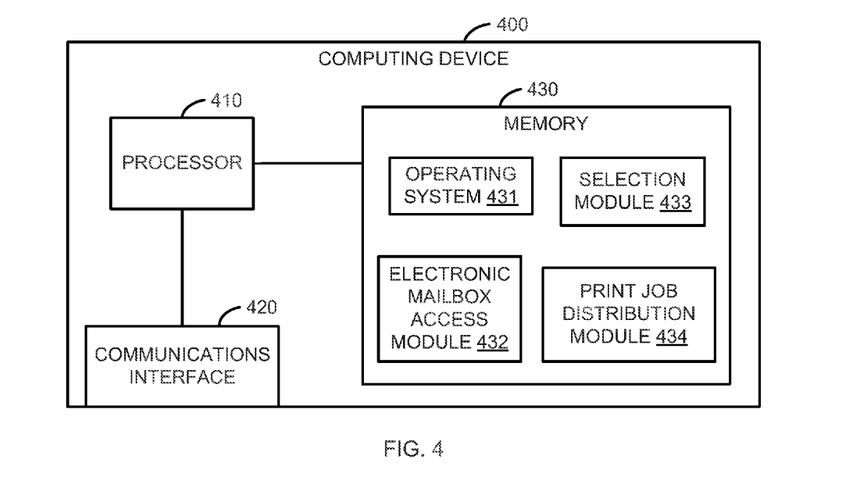
FIG. 4 is a schematic block diagram of a computing device hosting a print service system, according to an implementation.

FIG. 4 is a schematic block diagram of a computing device hosting a print service system, according to an implementation. Computing device 400 (e.g., a computer server, a group of computer servicer, a virtual machine, a group of virtual machines, or a combination thereof) includes processor 410, communications interface 420, and memory 430. Processor 410 is any combination of hardware and software that executes or interprets instructions, codes, or signals. For example, processor 410 can be a microprocessor, an application-specific integrated circuit (ASIC), a distributed processor such as a cluster or network of processors or computing devices, a multi-core or multi-processor processor, or a virtual or logical processor of a virtual machine.

Communications interface 420 is a module via which processor 410 can communicate with other processors or computing devices via communications link. For example, communications interface 420 can include a network interface card and a communications protocol stack hosted at processor 410 (e.g., instructions or code stored at memory 430 and executed or interpreted at processor 410 to implement a network protocol). As specific examples, communications interface 420 can be a wired interface, a wireless interface, an Ethernet interface, a Fiber Channel interface, an InfiniBand interface, and IEEE 802.11 interface, or some other communications interface via which processor 410 can exchange signals or symbols representing data to communicate with other processors or computing devices.

Memory 430 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 430 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 430 can be integrated with processor 410, separate from processor 410, or external to computing device 400.

Memory 430 includes instructions or codes that when executed at processor 410 implement operating system 431, electronic mailbox access module 432, selection module 433, and print job distribution module 434. Electronic mailbox access module 432, selection module 433, and print job distribution module 434 collectively implement a print service system. In other words, operating system 431, electronic mailbox access module 432, selection module 433, and print job distribution module 434 are each instructions or code that—when executed at processor 410—cause processor 410 to perform operations that implement, respectively, an operating system, an electronic mailbox access module, a selection module, and a print job distribution module. Said differently, operating system 431, electronic mailbox access module 432, selection module 433, and print job distribution module 434 are hosted at computing device 400 (or at processor 410). In some implementations, an account database and/or summary module of a print service system are also hosted at computing device 400.

In some implementations, computing device 400 can be a virtualized computing device. For example, computing device 400 can be hosted as a virtual machine at a computing server. Moreover, in some implementations, computing device 400 can be a virtualized computing appliance, and operating system 431 is a minimal or just-enough operating system to support (e.g., provide services such as a communications protocol stack and access to components of computing device 400 such as communications interface 420) a print service system including electronic mailbox access module 432, selection module 433, and print job distribution module 434.

A print service system (e.g., a print service system including electronic mailbox access module 432, selection module 433, and print job distribution module 434) can be accessed or installed at computing device 400 from a variety of memories or processor-readable media. For example, computing device 400 can access a remote processor-readable medium via communications interface 420 and the print service system at that processor-readable medium. As a specific example, computing device 400 can be a thin client that accesses operating system 431 and the print service system during a boot sequence.

As another example, computing device 400 can include (not illustrated in FIG. 4) a processor-readable medium access device (e.g., CD, DVD, SD, MMC, or a CF drive or reader) and the print service system at a processor-readable medium via that processor-readable medium access device. As a more specific example, the processor-readable medium access device can be a DVD drive at which a DVD including an installation package for the print service system is accessible. The installation package can be executed or interpreted at processor 410 to install the print service system at computing device 400 (e.g., at memory 430). Computing device 400 can then host or execute the print service system.

In some implementations, a print service system can be accessed at or installed from multiple sources, locations, or resources. For example, some components or modules of the print service system can be installed via a communications link, and other components or modules of the print service system can be installed from a DVD.

Figure 5:
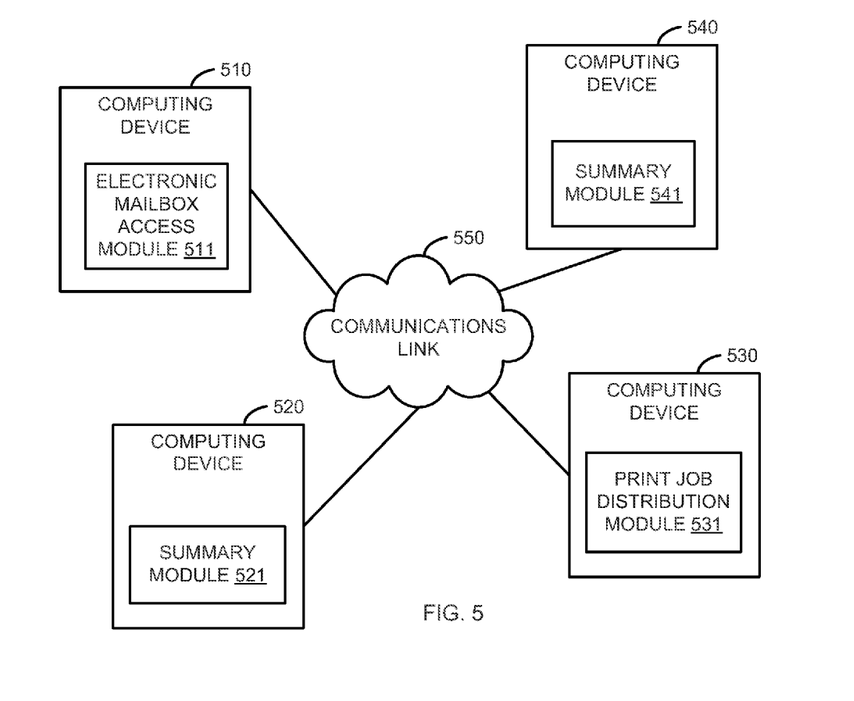
FIG. 5 is a schematic block diagram of a group of computing devices hosting a print service system, according to an implementation.

FIG. 5 is a schematic block diagram of a group of computing devices hosting a print service system, according to an implementation. As illustrated in FIG. 5, various components or modules of a print service system can be hosted at different computing devices in communication one with another via a communications link. In other words, a print service system can be distributed across a group of computing device. Such computing device can be physical computing devices such as computer servers, logical or virtual computing devices such as virtual machines, or a combination thereof. Such implementations can be referred to as cloud, cloud-based, or cloud-hosted implementations, and can be hosted within, for example, one or more data centers, physical computing devices, virtual computing devices, or a combination thereof.

As illustrated in FIG. 5, computing device 510 hosts electronic mailbox access module 511, computing device 520 hosts summary module 521, computing device 530 hosts print job distribution module 531, and computing device 540 hosts summary module 541. Electronic mailbox access module 511, summary module 521, print job distribution module 531, and summary module 541 are each a component of a print service system. The print service system can include other components such as an account database (not shown) hosted at one of computing devices 510, 520, 530, or 540, or at a different computing device (not shown).

Moreover, components of the print service system can be distributed across multiple computing devices. For example, as illustrated in FIG. 5, a summary module (comprising summary module 521, and 541) is distributed across computing devices 520 and 540. Such implementations can provide enhanced fault tolerance and failover capabilities for a print service system.

Figure 6:
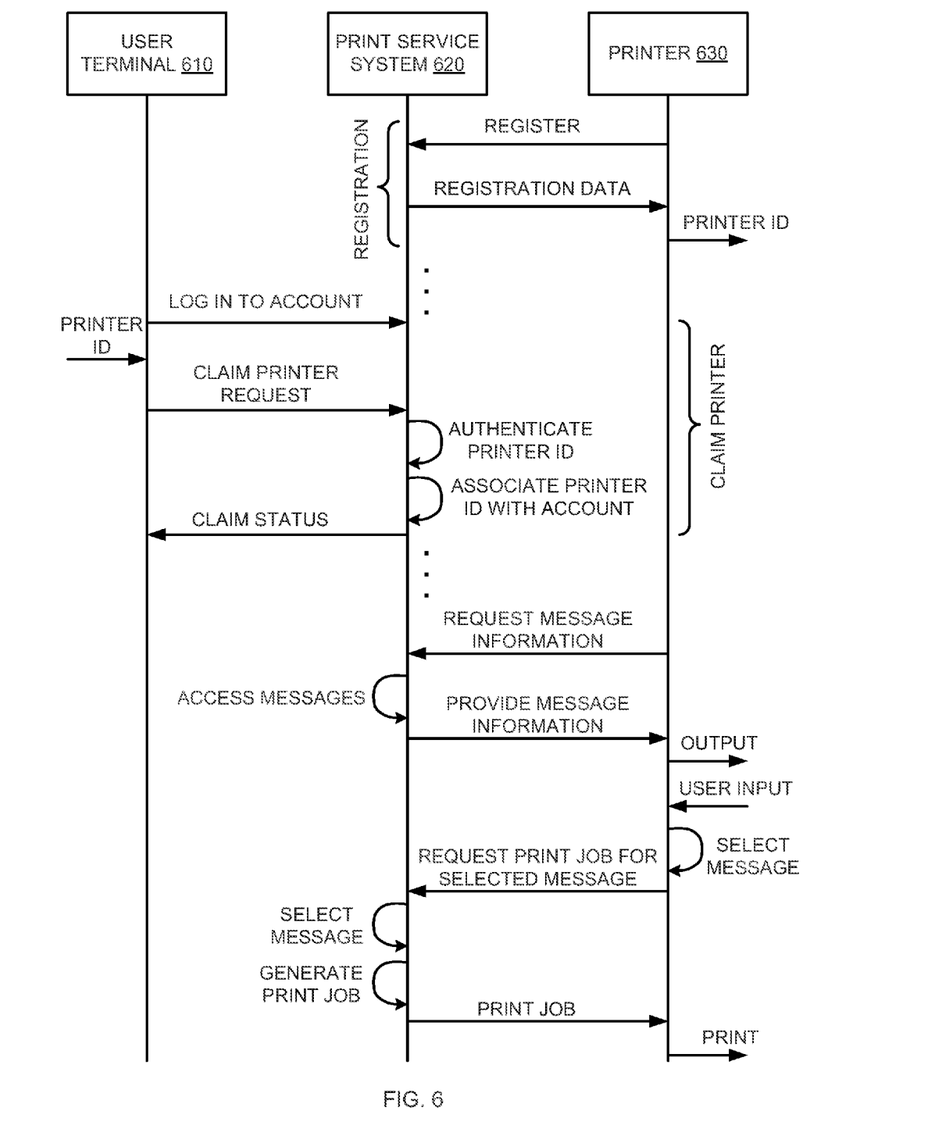
FIG. 6 is an illustration of data flow within an environment including a print service system, according to an implementation.

FIG. 6 is an illustration of data flow within an environment including a print service system, according to an implementation. Printer 630 communicates with print service system 620 using a protocol such as, for example, XMPP or another messaging protocol. In some implementations, printer and print service system 620 communicate one with another via a group of protocols. Similarly, user terminal 610 communicates with print service system 620 using a protocol such as the Hypertext Transmission Protocol (HTTP) and/or using a group of protocols.

Printer 630 registers with print service system 620 by sending identification information to print service system 620 to notify print service system 620 that printer 630 accepts print jobs from print service system 620. For example, printer 630 can provide an identifier such as a unique identifier (e.g., a hardware address), a credential such as a public key, an identifier of a message queue, a handle or alias for a messaging protocol, a description of functionalities or capabilities, or other identification information of printer 630 to print service system 620 to register with print service system 620.

Print service system 620 then provides registration data to printer 630. The registration data can include status information such as success or failure of the registration, a printer identifier of printer 630 within print service system 620, and/or other data related to registration of printer 630 with print service system 620. In some implementations, the printer identifier can be derived from identification data provided by printer 630 to print service system 620.

After receiving the printer identifier, printer 630 outputs the printer identifier. For example, printer 630 can output the printer identifier at a display module (e.g., a liquid-crystal display (LCD)) of printer 630. As another example, printer 630 can print the printer identifier.

After printer 630 is registered with print service system 620, printer 630 can be claimed by an account of print service system 620. In other words, printer 630 can be associated with an account of print service system 620. In the implementation illustrated in FIG. 6, using user terminal 610, a user logs in to an account of print service system 620 using user terminal 610 (e.g., a computing device). For example, the user can access print service system 620 via an Internet or web browser hosted at user terminal 610 using a username and password or other credential. The user provides the printer identifier output by printer 630 to user terminal 610, and user terminal 610 sends a claim printer request including the printer identifier to print service system 620.

Print service system 620 authenticates the printer identifier (e.g., by accessing a database of printer identifiers and verifying that the printer identifier is included in the database and has not been claimed by another account) to determine whether printer 630 can be claimed by the account. In some implementations, print service system 620 can request additional information or credentials from the user via user terminal 610 to authenticate the printer identifier. After print service system 620 authenticates the printer identifier, print service system 620 associates the printer identifier with the account of the user (i.e., the account to which the user previously logged in). For example, the printer identifier can be removed from a list or database including unclaimed printer identifiers, and included within account data for the user's account within an account database. Print service system 620 then provides a claim status (e.g., claim failed or claim succeeded) for the claim printer request to user terminal 610.

After printer 630 has been claimed by (or associated with) the account, printer 630 can be used by a user to select a message (or portion thereof) for printer at printer 630. As illustrated in FIG. 6, printer 630 requests message information from print service system 620. For example, printer 630 can request summary information related to messages available at one or more electronic mailbox associated with that account of print service system 620 by which printer 630 was claimed in response to input from a user. As a more specific example, printer 630 can request source information, subject information, attachment information, or other information about messages. Print service system 620 accesses the messages and provides the requested message information to printer 630. For example, print service system 620 can access messages at electronic mailboxes, provide the messages to a summary module of print service system 620 to generate summary message information related to each of the messages, and provide the summary message information and a message identifier for each message to printer 630. Thus, in this example, only a portion of the messages are provided to printer 630. This can be particularly useful, for example, to reduce the amount of data transmitted to and stored by printer 630.

Printer 630 outputs the message information (e.g., at a display modules of printer 630), and receives user input relative to the message information. For example, a user can touch a portion of a touch-sensitive display module of printer 630 at which message information for a message is displayed. Printer 630 can select that message in response to the user input. Said differently, printer 630 selects a message in response to user input relative to that message.

In other implementations, a user can provide user input to printer 630 via other input modules such as a keypad. Furthermore, the user input can also indicate which content (e.g., portion or portions) of the selected message should be printed. For example, the user input can indicate that attachments to the selected message should be printed, or that the body of the selected message should be printed. In some implementations, a particular portion or portions of the selected message are printed by default. For example, printer 630 or the account of print service system 620 by which printer 630 was claimed can include preferences or settings that specify a portion or portions of the selected message that should be printed.

Printer 630 sends a request for a print job (or print job request) for the selected message to print service system 620 to request that print service system 620 provide a print job for the selected message (or an indicated portion or portions thereof) to printer 630. The print job request can include for example, a message identifier for the selected message that was included in the message information sent from print service system 620 to printer 630 for the selected information. The print job request can also include other data such as a description of which content of a message should be included in a print job. Print service system 620 selects the message from the messages at the electronic mailbox or mailboxes associated with the account based on the print job request (or information such as a message identifier specified in the print job request), and generates a print job for that message.

Print service system 620 then provides the print job to printer 630, for example, using XMPP or another messaging protocol, and printer 630 processes the print job. That is, printer 630 prints content specified in the print job.

Figure 7:
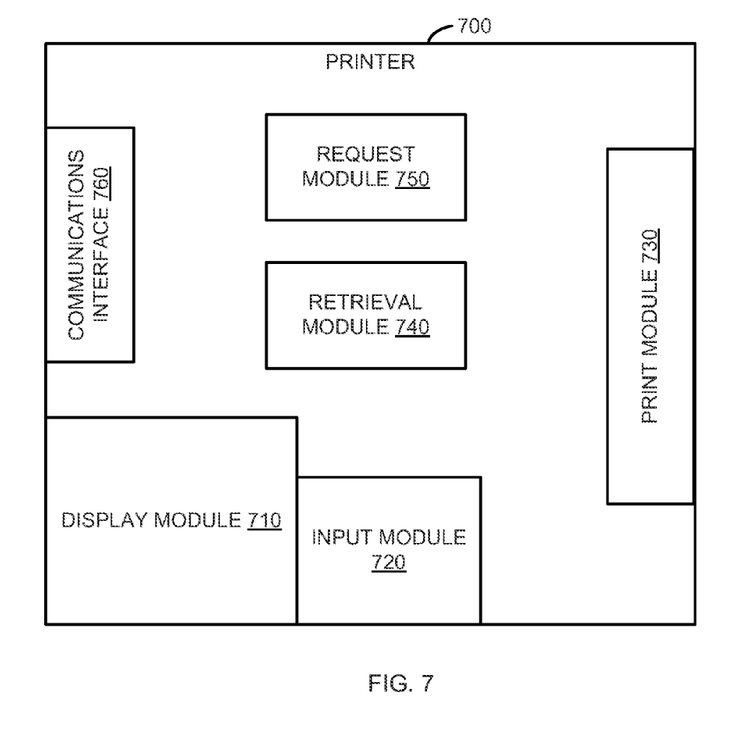
FIG. 7 is a schematic block diagram of a printer, according to an implementation.

As an example implementation of printer 630, FIG. 7 is a schematic block diagram of a printer, according to an implementation. Printer 700 includes display module 710, input module 720, print module 730, retrieval module 740, request module 750, and communications interface 760. Printer 700 is illustrated in FIG. 7 logically, and physical implementations of printer 700 can vary. For example, in some implementations, printer 700 can include a general-purpose processor and memory at which display module 710, input module 720, print module 730, retrieval module 740, request module 750, or communications interface 760 or portions thereof are stored at the memory and hosted at the general-purpose processor. In other implementations, display module 710, input module 720, print module 730, retrieval module 740, request module 750, or communications interface 760 or portions thereof can be implemented at application-specific integrated circuits (ASICs). In some implementations, portions of display module 710, input module 720, print module 730, retrieval module 740, request module 750, or communications interface 760 can be stored at a memory and hosted at a general-purpose processor and other portions of display module 710, input module 720, print module 730, retrieval module 740, request module 750, or communications interface 760 can be implemented as ASICs.

Display module 710 is a module via which information can be output or displayed. For example, display module 710 can include an LCD or other display and instructions or code that are hosted at a processor to implement a driver of display module 710. Similarly, input module 720 is a module via which information can be input to printer 700. For example, input module 720 can be a keypad or a touch-sensitive surface. Additionally, input module 720 can include instructions or code that are hosted at a processor to implement a driver of input module 720. In some implementations, display module 710 and input module 720 are integrated. For example, in some implementations, printer 700 includes a touch-sensitive display that includes display module 710 and input module 720.

Similar to communications interface 420 discussed above in relation to FIG. 4, communications interface 760 is a module via which processor 410 can communicate with other processors or computing devices via communications link. For example, communications interface 760 can include a network interface card and a communications protocol stack hosted at processor. As specific examples, communications interface 760 can be a wired interface, a wireless interface, an Ethernet interface, a Fiber Channel interface, an InfiniBand interface, and IEEE 802.11 interface, or some other communications interface via which printer 700 can exchange signals or symbols representing data to communicate with computing devices or services such as a print service system.

Print module 730 includes hardware and instructions or code that are hosted at a processor to implement a print engine and print content. More specifically, for example, print module 730 can include driver software hosted at a processor and rollers, motors, stepper motors, paper guidance mechanisms, ink heads, a laser, electrostatic charge deposition mechanisms, or other hardware to print content. Print module 730 receives print jobs via communications interface 760, and prints content specified in the print jobs.

Retrieval module 740 communicates with a print service system via communications interface 760 to access message information for messages from one or more electronic mailboxes. Additionally, retrieval module 740 receives message information and provides the message information to display module 710 for output. For example, retrieval module 740 can communicate with a summary module of a print service system to access summaries of messages from one or more electronic mailboxes.

Request module 750 selects a message based on user input relative to that message at input module 720, and generates a print job request for that message. Request module 750 then provides the print job request to a print service system via communications interface 760. For example, request module 750 can receive input notification in response to user input at input module 720, determine to which message the user input is related (e.g., based on a location or content of the user input), select the message to which the user input is related, and sent a print job request for that message to a print service system.

Figure 8:
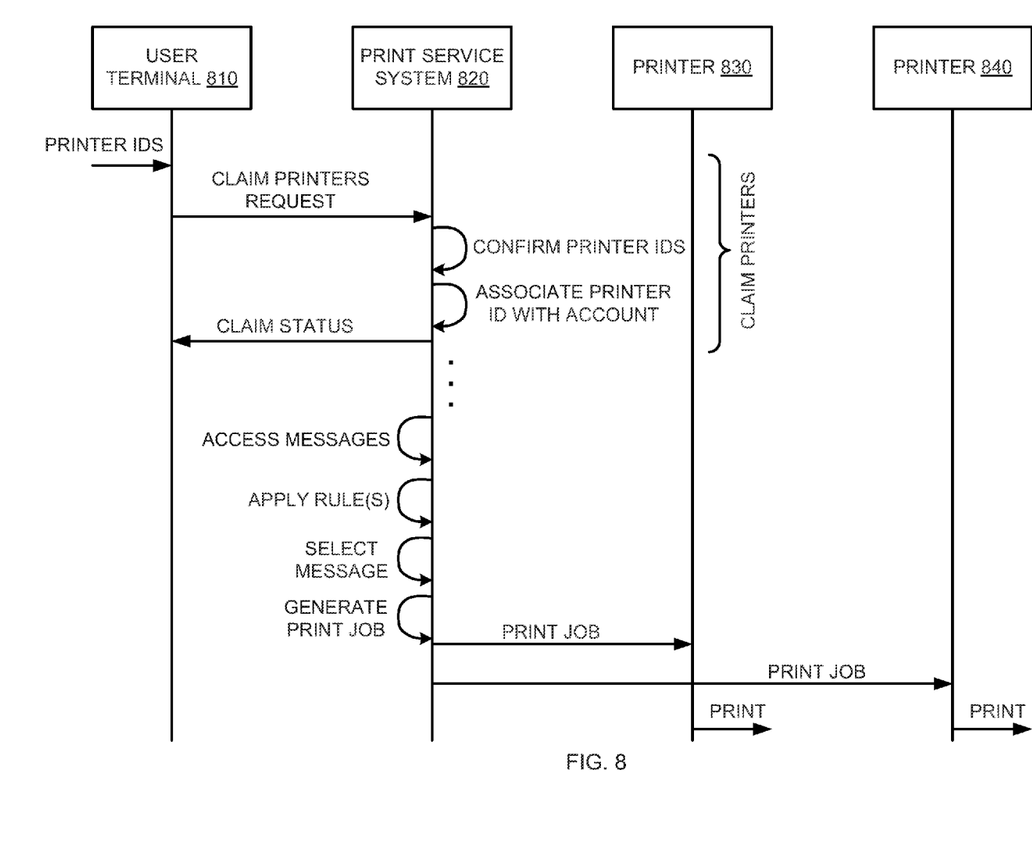
FIG. 8 is an illustration of data flow within an environment including a print service system, according to another implementation.

FIG. 8 is an illustration of data flow within an environment including a print service system, according to another implementation. In the example illustrated in FIG. 8, printers 830 and 840 have been registered with print service system 820 (e.g., each using a methodology similar to that illustrated in FIG. 6 for printer 630 and print service system 620). Printers 830 and 840 can be claimed by an account of print service system 820. In other words, printers 830 and 840 can be associated with an account of print service system 820 similar to printer 630 and print service system 620 illustrated in FIG. 6.

In the implementation illustrated in FIG. 8, using user terminal 810, a user logs in to his or her account at print service system 820 using user terminal 810 (e.g., a computing device). The user provides printer identifiers output by printers 830 and 840 to user terminal 810, and user terminal 810 sends a claim printer request including the printer identifiers to print service system 820.

Print service system 820 authenticates the printer identifiers to determine whether printers 830 and 840 can be claimed by the account. In some implementations, print service system 820 can request additional information or credentials from the user via user terminal 810 to authenticate the printer identifiers. After print service system 820 authenticates the printer identifiers, print service system 820 associates the printer identifiers with the account of the user (i.e., the account to which the user previously logged in), and printers 830 and 840 are claimed by the account. For example, the printer identifiers can be removed from a list or database including unclaimed printer identifiers, and included within account data for the user's account within an account database. Print service system 820 then provides a claim status (e.g., claim failed or claim succeeded) for the claim printer request to user terminal 810.

After printers 830 and 840 have been claimed by (or associated with) the account, print service system 820 can provide print jobs to one or both of printers 830 and 840. For example, print service system 820 can communicate with printers 830 and 840 similarly to the methodology discussed in FIG. 6 to provide message information to printers 830 and 840, receive print job requests from printers 830 and 840, and provide the requested print jobs to printers 830 and 840. Moreover, printer service 820 can provide print jobs to printers 830 and 840 as illustrated in FIG. 8.

More specifically, for example, print service system 820 can regularly, periodically, or in response to input or signals access messages at one or more electronic mailboxes associated with the account by which printers 830 and 840 have been claimed. Print service system 820 can then apply one or more rules for that account to those messages, and select a message or messages that satisfy one or more rules. Print service system 820 then generates a print job for the selected message or messages, and provides print jobs to printers 830 and 840 to cause printers 830 and 840 to print content from the selected message or messages. Thus, print service system 820 can distribute print jobs to multiple printers.

In some implementations, the rules applied to messages can specify to which printers print service system 820 should distribute or provide print jobs generated from messages satisfying that rule. For example, one rule can specify that a print job should be sent to one printer, and another rule can specify that print jobs should be sent to each printer associated with the account or to some subset of those printers. Moreover, referring to the methodology illustrated in FIG. 6, a print job request can similarly specify printers to which a print service system should provide a print job requested by that print job request.

Furthermore, in some implementations, a rule or print job request can specify printer capabilities or properties, and print service system 820 can send a related print job to a printer or printers that include or support those capabilities or properties. For example, an account of print service system 820 can store identifiers or descriptions of capabilities or properties of printers claimed by that account, and print service system 820 can compare those identifiers or descriptions with the capabilities or properties described in a rule or print job request.

Print service system 820 can then provide the print job to the printers that support the capabilities or properties described in a rule or print job request.

While certain implementations have been shown and described above, various changes in form and details may be made. For example, some features that have been described in relation to one implementation and/or process can be related to other implementations. As a specific example, portions of the methodology illustrated and discussed in relation to FIG. 6 can be applicable to the methodology illustrated and discussed in relation to FIG. 8. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Furthermore, as used herein, the singular forms "a," "an," and "the" include plural referents unless the context clearly dictates otherwise. Thus, for example, the term "module" is intended to mean one or more modules or a combination of modules.

What is claimed is:

1. A print service system, comprising:
a processor; and
a memory to store machine readable instructions, which when executed by the processor cause the processor to:
receive a request for printing a message in an electronic mailbox associated with a user account, wherein the request includes a printer identifier identifying a printer to print the message;
authenticate the printer identifier to determine that the printer is associated with the user account;
access a plurality of messages at the electronic mailbox associated with the user account, wherein to access the plurality of messages at the electronic mailbox, the processor is to access stored credentials associated with the electronic mailbox, and log into the electronic mailbox at a mail server with the credentials;
apply a rule to the plurality of messages and select the message from the plurality of messages, wherein the rule is associated with the user account, and the message satisfies the rule; and
provide a print job associated with the message to the printer associated with the user account.

2. The print service system of claim 1, further comprising an account database storing the credentials associated with the electronic mailbox.

3. The print service system of claim 1, wherein the processor is to identify, according to the user account, the rule from a plurality of stored rules associated with a plurality of user accounts in the print service system, the message satisfying the rule.

4. The print service system of claim 1, wherein the processor is to receive the request for the print job from the printer.

5. The print service system of claim 1, wherein the processor is further to provide information associated with each message from the plurality of messages to the printer.

6. The print service system of claim 1, wherein the processor is to:
receive a registration request from the printer;
register the printer with the print service system; and
transmit registration information to the printer, wherein the registration information includes the printer identifier assigned to the printer by the print service system.

7. The print service system of claim 1, wherein the rule includes at least one of a plurality of conditions including a source condition applied to a source of each of the plurality of messages to determine whether the source satisfies the source condition, a content condition applied to content of each of the plurality of messages to determine whether the content satisfies the content condition, and a time condition applied to a timestamp of each of the plurality of messages to determine whether the timestamp satisfies the time condition, wherein the processor is to apply the at least one condition to determine whether each of the plurality of messages satisfies the rule.

8. The print service system of claim 1, wherein the processor is to access the plurality of messages at a plurality of electronic mailboxes associated with the user account.

9. An electronic mailbox message printing method, comprising:
receiving, at a print service system, a request for printing a message in an electronic mailbox associated with a user account, wherein the request includes a printer identifier identifying a printer to print the message;
authenticating, by a processor of the print service system, the printer identifier to determine that the printer is associated with the user account;
accessing credentials associated with the electronic mailbox;
logging into the electronic mailbox at a mail server with the credentials;
accessing, by the processor, a plurality of messages in the electronic mailbox in response to the logging into the electronic mailbox;
selecting the message from the plurality of messages at the electronic mailbox;
generating a print job associated with the message from the plurality of messages; and
providing the print job to the printer associated with the user account.

10. The method of claim 9, further comprising:
providing, before the selecting, information associated with the plurality of messages to the printer.

11. The method of claim 9, wherein the plurality of messages is a first plurality of messages and the electronic mailbox is a first electronic mailbox, the method further comprising:
accessing a second plurality of messages at a second electronic mailbox;
providing information associated with the second plurality of messages to the printer.

12. The method of claim 9, further comprising:
receiving a registration request from the printer;
registering the printer with the print service system; and
transmitting registration information to the printer, wherein the registration information includes the printer identifier assigned to the printer by the print service system.

13. The method of claim 9, further comprising:
providing the print job to a plurality of printers associated with the user account.

14. The method of claim 9, wherein the message is a first message, the method further comprising selecting a second message from the plurality of messages at the electronic mailbox associated with the user account by identifying, according to the user account, a rule from a plurality of stored rules associated with a plurality of user accounts; and applying the rule associated with the user account to the plurality of messages, the second message satisfying the rule.

15. A printer, comprising:
a processor; and
a memory storing machine readable instructions executable to cause the processor to:
register the printer with a print service system, including providing at least one of a unique identifier of the printer and a credential to the print service system, and receiving a printer identifier assigned by the print service system in response to providing at least one of the unique identifier and the credential,
output the printer identifier assigned by the print service system to a user, and
process a print job received from the print service system after the print service system has received a request for printing a message in an electronic mailbox for an account of the user, the request including the printer identifier identifying the printer to print the message, and the print service system has authenticated the printer identifier to determine that the printer identifier is associated with the account of the user.

16. The printer of claim 15, wherein the processor is to access information associated with the message at the print service system.

17. The printer of claim 16, wherein the processor is further to identify the message based on user input relative to the information.

18. The printer of claim 16, wherein the information includes a subject portion of the message.

19. The method of claim 9, wherein selecting a message comprises applying a rule to select the message, wherein the rule includes at least one of a plurality of conditions including a source condition applied to a source of each of the plurality of messages to determine whether the source satisfies the source condition, a content condition applied to content of each of the plurality of messages to determine whether the content satisfies the content condition, and a time condition applied to a timestamp of each of the plurality of messages to determine whether the timestamp satisfies the time condition, wherein the at least one condition is applied to determine whether each of the plurality of messages satisfies the rule.

* * * * *